(12) United States Patent
Hamza

(10) Patent No.: US 7,784,117 B2
(45) Date of Patent: Aug. 31, 2010

(54) ELECTROMECHANICAL SAFETY VALVE SYSTEM FOR SWIMMING POOL AND SPA PUMPS

(76) Inventor: Hassan H. Hamza, 6358 Raylene Ct., Simi Valley, CA (US) 93063

(*) Notice: Subject to any disclaimer, the term of this patent is extended or adjusted under 35 U.S.C. 154(b) by 884 days.

(21) Appl. No.: 11/462,088

(22) Filed: Aug. 3, 2006

(65) Prior Publication Data

US 2006/0260034 A1    Nov. 23, 2006

Related U.S. Application Data

(63) Continuation-in-part of application No. 11/338,563, filed on Jan. 23, 2006, now Pat. No. 7,455,070, which is a continuation-in-part of application No. 11/076,513, filed on Mar. 8, 2005, now Pat. No. 7,493,913.

(51) Int. Cl.
*E04H 4/00*    (2006.01)

(52) U.S. Cl. .............................. 4/504; 4/509; 417/306; 137/467

(58) Field of Classification Search ............... 417/44.3, 417/44.4, 306; 4/504
See application file for complete search history.

(56) References Cited

U.S. PATENT DOCUMENTS

| | | | |
|---|---|---|---|
| 398,445 | A | 2/1889 | Pratt |
| 3,556,677 | A * | 1/1971 | Tremain ..................... 417/44.3 |
| 4,398,557 | A | 8/1983 | Dugge |
| 4,817,991 | A | 4/1989 | Frentzel et al. |
| 4,951,701 | A | 8/1990 | Boehmer |
| 5,682,624 | A | 11/1997 | Ciochetti |
| 5,809,587 | A | 9/1998 | Fleischer |
| 5,822,807 | A | 10/1998 | Gallagher et al. |
| 5,947,700 | A | 9/1999 | McKain |
| 5,991,939 | A | 11/1999 | Mulvey |
| 6,059,536 | A | 5/2000 | Stingl |
| 6,171,073 | B1 | 1/2001 | McKain |
| 6,251,285 | B1 | 6/2001 | Ciochetti |
| 6,295,661 | B1 | 10/2001 | Bromley |
| 6,342,841 | B1 | 1/2002 | Stingl |
| 6,468,052 | B2 | 10/2002 | McKain |
| 6,591,863 | B2 | 7/2003 | Ruschell et al. |
| 6,687,923 | B2 | 2/2004 | Dick et al. |
| 6,779,205 | B2 * | 8/2004 | Mulvey et al. .................. 4/509 |

* cited by examiner

*Primary Examiner*—Gregory L Huson
*Assistant Examiner*—Karen Younkins
(74) *Attorney, Agent, or Firm*—Kelly Lowry & Kelley, LLP

(57) ABSTRACT

A vacuum relief safety valve includes a housing defining an inner chamber and attached to the suction-side of the swimming pool or spa pump. An air inlet aperture is formed in the housing so as to be open to ambient air. A sealing element is disposed within the housing and biased against the air inlet aperture by a spring so as to effectively seal the inner chamber of the housing from ambient air. When a maximum allowed vacuum level within the pump is exceeded, such as when a swimming pool drain is obstructed, the sealing element moves into the inner chamber and opens the air inlet aperture causing the pump to rapidly lose its prime and enabling removal of the entrapment. Simultaneously, the movement of the sealing element provides electricity to a control circuit which shuts off power to the pump.

21 Claims, 8 Drawing Sheets

ELECTROMECHANICAL SAFETY VALVE SYSTEM FOR SWIMMING POOL AND SPA PUMPS

BACKGROUND OF THE INVENTION

The present invention generally relates to vacuum relief valves. More particularly, the present invention relates to a vacuum relief safety valve system for use in swimming pools, spas and the like which causes the pump to lose its prime and be shut off if a pre-determined vacuum level is reached in the pump system, such as when an object obstructs the pool's drain.

To maximize enjoyment and maintain proper sanitary conditions, swimming pools must be constantly cleaned of debris, dirt and other contaminants. Pools of various types are known to have one or more suction inlets where pool water is sucked along the line via a pump to filtration, aeration, chemical treatment and other type of equipment prior to being returned to the pool via one or more return outlets.

In more recent pool designs, some of the suction inlets are positioned in the bottom or lower region of the pool. Very recently developed pool systems, known as in-floor cleaning systems, have one or more suction inlets which suck pool water therethrough and any debris of pollutants entrained therein are cleaned from the water by being pumped through a filtration and/or treatment station. As with all pools and spas, a high rate of water flow must be achieved in order to maintain an acceptable level of cleanliness. Consequently, a high capacity pump must be employed to draw the water from the pool, with a relatively larger pump generally being required as the size of the pool increases.

Some of the water inlets of such drains have relatively small opening areas and, when large volumes of water being pumped therethrough, very high suction forces at the inlet can be induced. These forces can be so extreme that if a pool user contacts the inlet by any part of their body, they can be held thereagainst, unable to be dislodged, even by force. Such vacuum forces have become so excessive that there have been cases of disembowelment. When the suction inlet is located at or more adjacent to the bottom of a pool, the user can thus be submerged with the risk of drowning or other grievous injury. When such an incident occurs, the vacuum level in the drain line and pool's pump rises sharply.

Occurrences of this type of accident have caused the pool industry to look for solutions that prevent an individual, such as a child, from becoming entrapped at the drain. Some approaches have been by modifying the drain's construction. Examples of this approach include U.S. Pat. No. 5,809,587 to Fleischer and U.S. Pat. No. 6,295,661 to Bromley. However, these devices are fairly complex and expensive to produce. Moreover, these approaches are only acceptable for new pool construction, and are not capable of being incorporated as a retrofit into existing pools and spas.

Yet other approaches involve the insertion of a safety valve into a section line of the filtration pump system. Examples of these include, U.S. Pat. No. 5,682,624 to Ciochetti; U.S. Pat. No. 6,591,863 to Ruschell et al.; and U.S. Pat. No. 6,687,923 to Dick et al. However, this approach also presents many drawbacks. First, such piping is typically submerged below the ground and often encased in or otherwise positioned below concrete. Thus, access to the pipes is not readily obtained unless the safety valve is incorporated into the system when the swimming pool is built. Otherwise, the valves require that the pipe be cut so that the safety valve device can be inserted therein. Cutting these lines increases the opportunity for air leakage in the suction side. Moreover, such installation typically requires professionals having the appropriate tools and ability to install such safety devices.

Oftentimes, these devices also require calibration by experimentation at the pool site such that the safety valve opens only in an excessive vacuum situation. For example, U.S. Pat. No. 5,682,624 includes a manual turn screw for calibrating the valve assembly at the pool site. However, vacuum levels of a specific pump can change from one day to another due to many factors. Moreover, such manual calibration is dangerous if a child were to turn the knob and adjust the calibration such that the safety device did not work properly. Another problem with the '624 device is that it includes many openings which can be filled with water, dirt, insects and other debris. A problem with all such "in-line" systems is that they are typically not close to the pump. The closer one gets to the pump, the better the safety device responds to emergencies.

Yet other prior art approaches utilize electric controls to monitor and control the amount of suction within a line or within the pump. For example, U.S. Pat. Nos. 6,059,536 and 6,342,841 both to Stingl disclose such systems. Other systems include U.S. Pat. Nos. 5,947,700, 6,171,073 and 6,468,052 all to McCain. The systems taught in these Patents electrically sense and analyze negative pressure levels within the system and compare the sensed levels with acceptable norms programmed into the electric circuitry. If the negative pressure norms are exceeded, air is introduced into the system, the pump is deactivated, and/or alarms and the like are activated. However, these systems present several drawbacks. Typically, these systems must be adjusted in the field for the particular pump system. Moreover, these systems are relatively expensive and complex.

Accordingly, there is a continuing need for a pool safety valve system which overcomes the deficiencies described above. The safety valve should be capable of being attached directly to the pump. The safety valve system should also be simple enough in design so as to be manufactured inexpensively and installed by the pool owner. The safety valve system should also be capable of being used in existing pools as a retrofit. The present invention fulfills these needs and provides other related advantages.

SUMMARY OF THE INVENTION

The present invention resides in a vacuum relief safety valve system for a swimming pool or spa pump. The safety valve generally comprises a housing defining an inner chamber and attached to the swimming pool or spa pump, or a suction-side pipe of the swimming pool or the spa, so as to be in fluid communication with the pump. Typically, the housing is connected to the pump by means of threaded adapters or secured to a built-in mounting base. In a particularly preferred embodiment, the housing is threadedly connected to a drainage port of the pump.

The housing is typically comprised of a base plate and a cap which cooperatively define the inner chamber. The base plate includes an outwardly threadedly extension and an aperture extending through the extension and the base plate and into the inner chamber. An air inlet aperture is typically formed in an end wall of the cap generally opposite the base plate. The air inlet aperture is open to the environment and ambient air. An inner wall of the housing includes at least one flute channel formed therein which permits air to flow therethrough, to the base plate, and into the pump.

A sealing element is disposed within the housing and a portion of the element is biased against the air inlet aperture so as to effectively seal the inner chamber from ambient air. A spring disposed within the inner chamber of the housing biases the sealing element against the air inlet aperture. The sealing element may comprise a disk, a ball, or any other configuration which effectively seals the air inlet aperture. In a particularly preferred embodiment, the sealing element includes an O-ring or gasket around a peripheral edge thereof which provides an orthogonal seal against an upper ledge of the housing adjacent to the air inlet aperture of the housing.

The sealing element is adapted to move into the inner chamber and open the air inlet aperture when a maximum allowed vacuum level within the pump is exceeded, such as when the swimming pool or spa drain is obstructed.

In a particularly preferred embodiment, a seat is formed in the housing against which an end of the spring, generally opposite the sealing element, engages. The seat includes a notch or passageway therein to permit water or air to pass therethrough even when the spring is compressed.

Preferably, the sealing element includes at least one arm extending therefrom having at least a portion thereof biased against the inner wall of the housing. In a particularly preferred embodiment, a spring is disposed within a plurality of arms so as to bias the arms outwardly against the inner wall of the housing. The sealing element is automatically retracted back to its closed position when the pump loses its prime.

In accordance with the present invention, the vacuum relief safety valve also incorporates a switch, wherein when the sealing element is moved into the housing by virtue of an excessive negative pressure within the pump, the switch is activated, causing the pump to be deactivated. In one embodiment, a limit switch includes a depressable member which is biased in the open position. A projection of the sealing element is configured to come into contact with the depressable member as the sealing element is moved into the housing when excessive negative pressure conditions are present. The physical contact between the sealing element projection and the switch member closes the switch, providing electrical current to a low voltage circuit which shuts off power to the pump. In a particularly preferred embodiment, the electric circuit temporarily shuts off power to the pump so that the pump automatically regains power after a predetermined period of time.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
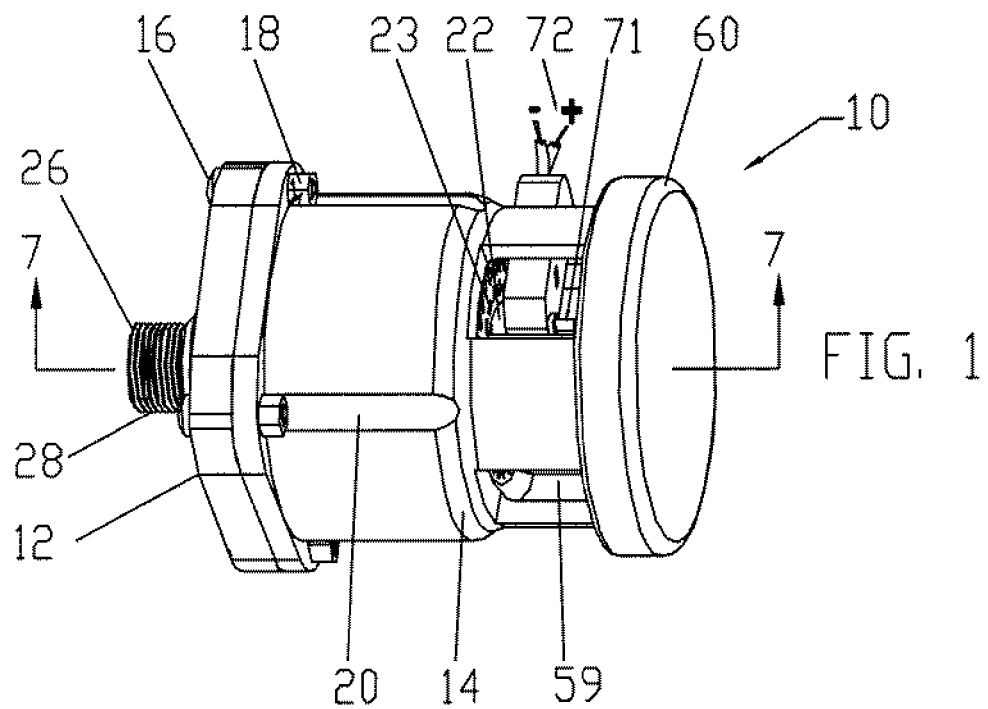
FIG. 1 is a side perspective view of a vacuum relief safety valve embodying the present invention.
Figure 2:
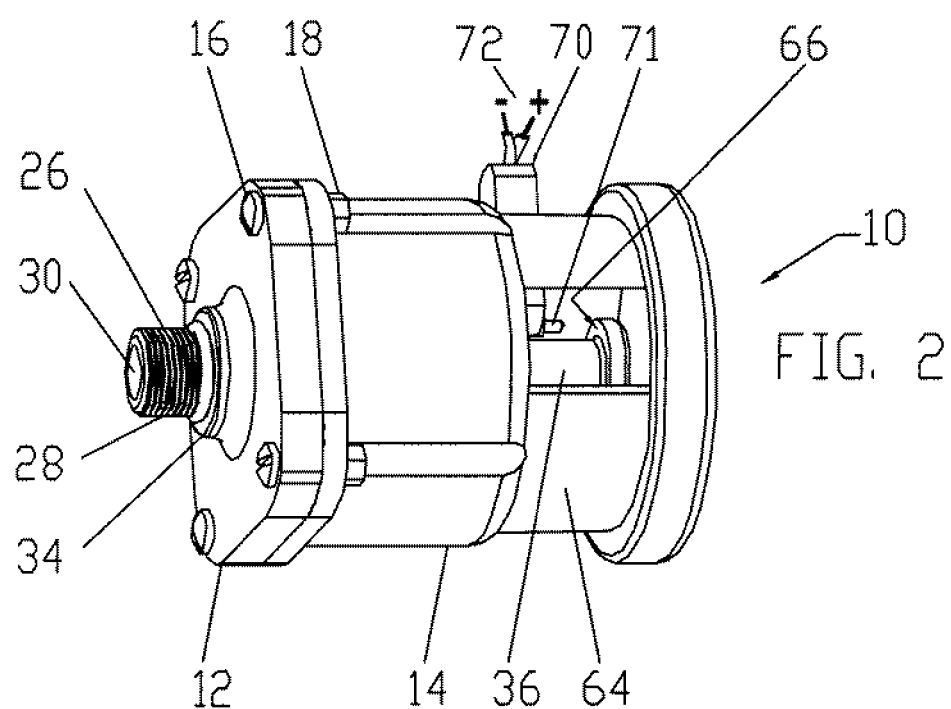
FIG. 2 is another perspective view of the safety valve of FIG. 1.

As shown in the accompanying drawings for purpose of illustration, the present invention resides in a vacuum relief safety valve for a swimming pool or spa pump which is designed to open and introduce ambient air into the pump such that it loses its prime when a vacuum level is exceeded, such as when a swimming pool drain is obstructed. Moreover, as will be more fully described herein, the present invention temporarily shuts off power to the pump. When the terminology "pool" or "spa" is used herein, it includes swimming pools, spas, ponds, lakes, etc., especially when the aforementioned have recreational applications. The term "drain" or "inlet" is used throughout the specification and can include one or more inlets or drains of various types. The present invention is particularly suited for residential pools, spas and hot tubs.

With reference now to FIGS. 1-4, a vacuum relief safety valve 10 embodying the present invention is shown. The safety valve 10 typically includes a base plate 12 and an upper cap 14 which are attached to one another, such as by the illustrated bolts and nuts 16 and 18. In a particularly preferred embodiment, as illustrated, the housing includes a plurality of ribs 20 which serve as frictional grips such that a homeowner can grasp the safety valve 10 for threaded connection to the swimming pool pump or related equipment, as will be more fully described herein.

In the preferred embodiment illustrated in FIGS. 1-4, an air inlet aperture 22 is formed through the housing, typically in an end wall 24 of the cap 14. In a particularly preferred embodiment of the present invention, a mesh screen or the like 23 is disposed adjacent to the inlet aperture 22, and adapted to prevent insects, leaves, dirt, etc., from entering the air inlet aperture. At a generally opposite end of the safety valve 10 is an extension 26 which includes exterior threads 28 for insertion into a threaded aperture, such as a drainage port or other threaded port of the pump filtration system, as will be more fully described herein. Although the extension 26 is typically threadedly connected to an internally threaded aperture on the pump, it will be appreciated by those skilled in the art that the extension 26 may also be equipped so as to be received within a threaded opening of the pipe, or even fastened to either the pump or the pipe by other means, such as an adhesive. An aperture 30 extends through the extension 26 and base plate 12 such that fluid flow is possible between aperture 22 and 30 under certain conditions. Preferably, a seal such as the illustrated O-ring 34 encircles the extension 26 so as to provide a fluid and air tight seal between the safety valve 10 and the pump or piping.

Figure 3:
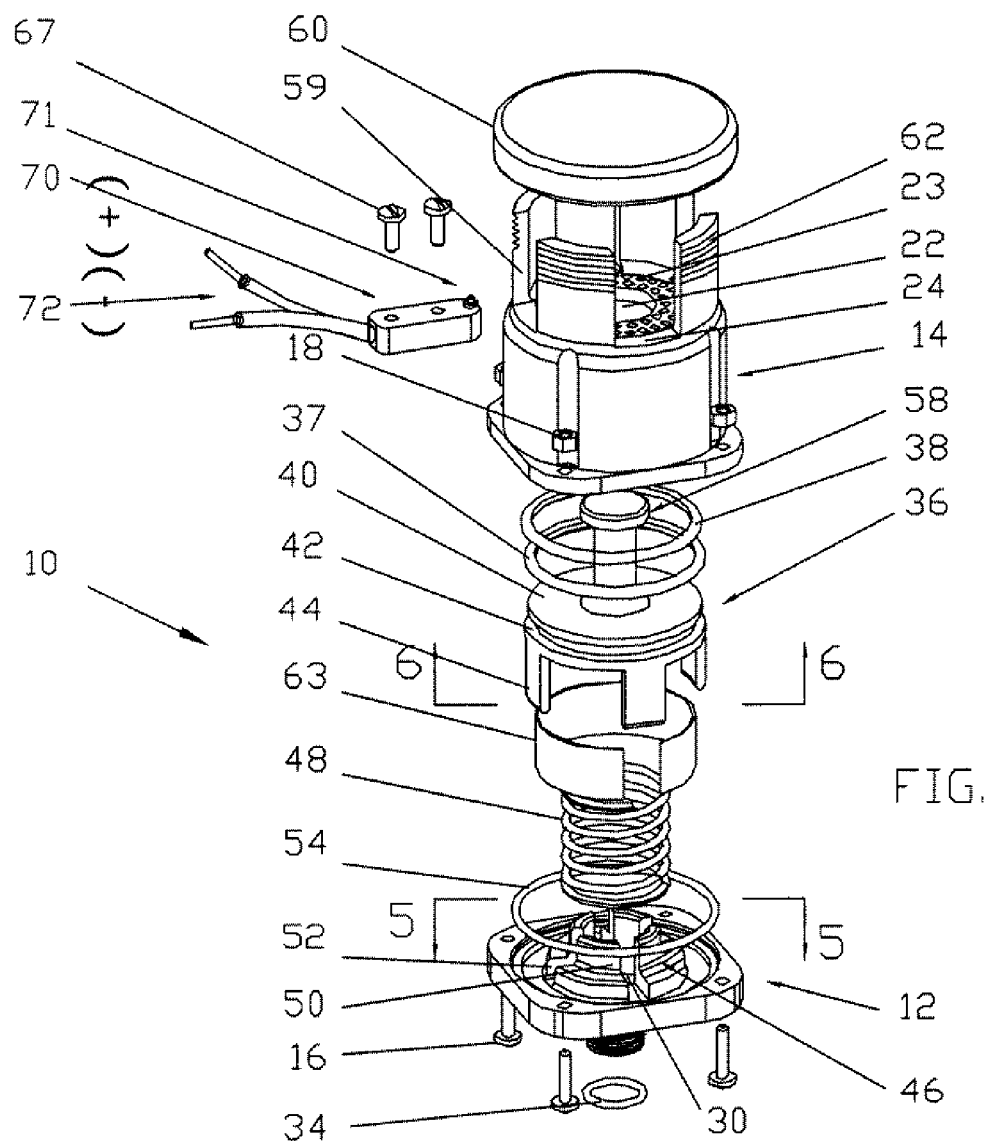
FIG. 3 is a top exploded perspective view of the safety device of FIG. 1, illustrating the various component parts thereof.
Figure 4:
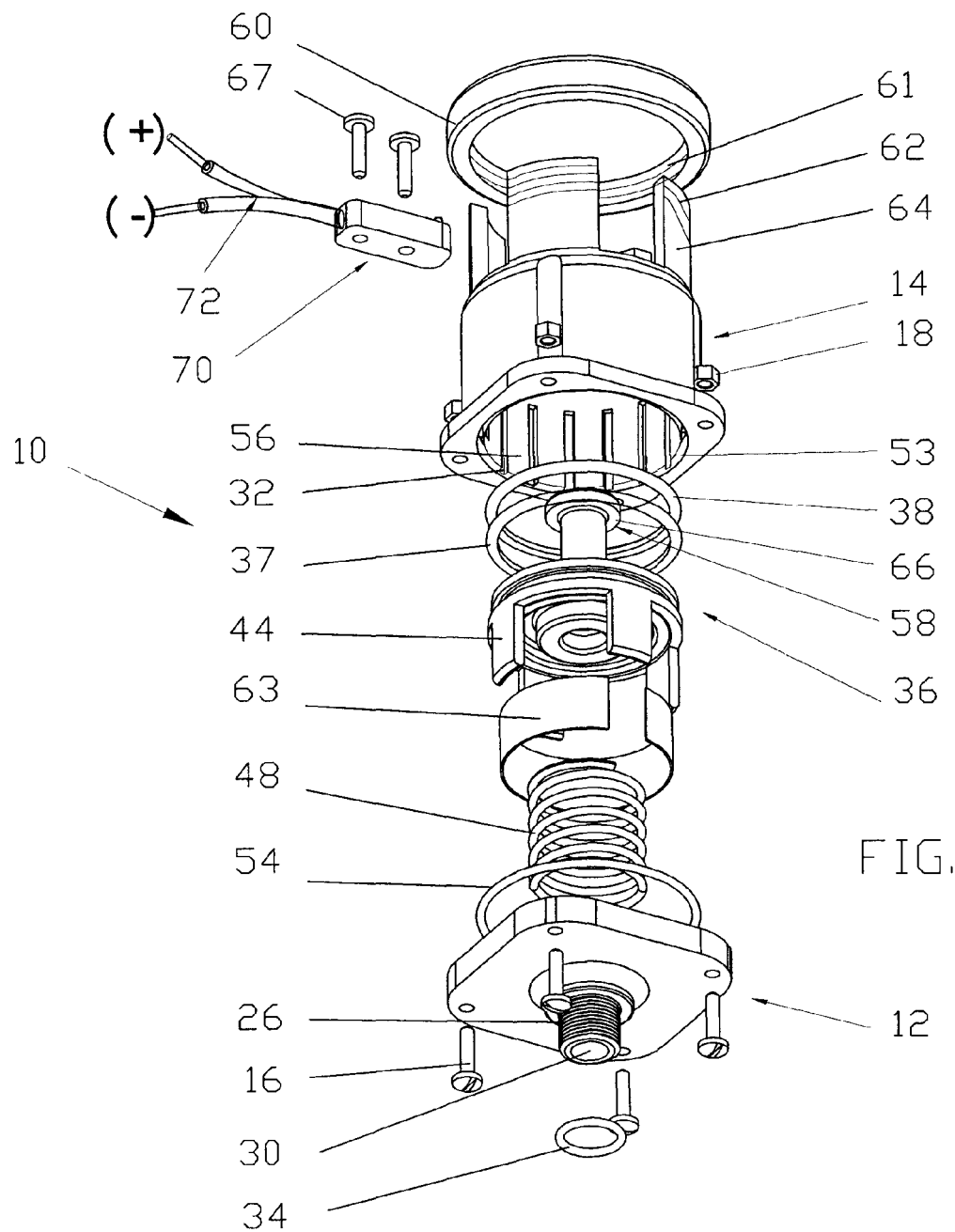
FIG. 4 is another exploded perspective view of the safety valve of FIG. 1.

With reference now to FIGS. 3-8, a sealing element 36 is disposed within the housing and biased upwardly against the upper end wall 24 of the cap 14 so as to seal the air inlet aperture 22. O-ring 37 engages radially to form a seal between sealing element 36 and the inside of the housing at ledge 39 to form a piston like mechanism that creates pneumatic compensation for any existing pool set-up. Also, this dual sealing will work as a primary air and fluid tight seal. A gasket, such as the illustrated rubber O-ring 38, is disposed between the housing and the sealing element 36 so as to create a back-up air and fluid-tight seal. In a particularly preferred embodiment, the sealing element 36 is of a disc-figuration, as illustrated in FIGS. 3 and 4, so as to include an upper plate portion 40 sized to extend into the air inlet aperture 22, and preferably having a beveled skirt which forms a conic sealing surface for better air tight sealing when it engages the O-ring 38. Arms 44 extend outwardly from the sealing element 36 so as to flex against an inner wall of the housing, as will be more fully described herein.

The base plate 12 includes a seat 46 which supports a spring 48 thereon. The spring is a compression spring so as to extend outwardly away from the base plate 12 and contact the sealing element 36 so as to bias it into engagement with the upper wall 24 of the cap 14 so as to seal the air inlet aperture 22. The seat 46 preferably includes a cylindrical guide 50 which extends into the spring 48 and properly positions the spring 48. The seat 46 preferably includes one or more channels 52, as will be more fully described herein. Typically, a gasket, such as a rubber O-ring 54, is used to seal the base plate 12 and cap 14 such that the housing is air and fluid tight.

Figure 5:
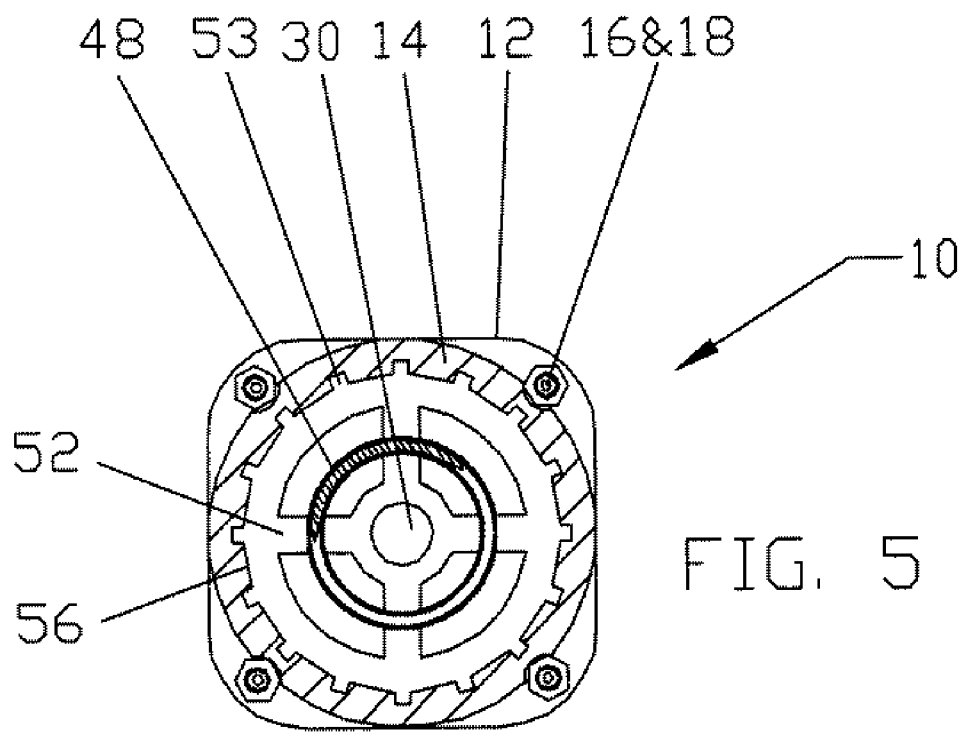
FIG. 5 is a cross-sectional valve taken generally along line 5-5 of FIG. 3.
Figure 8:
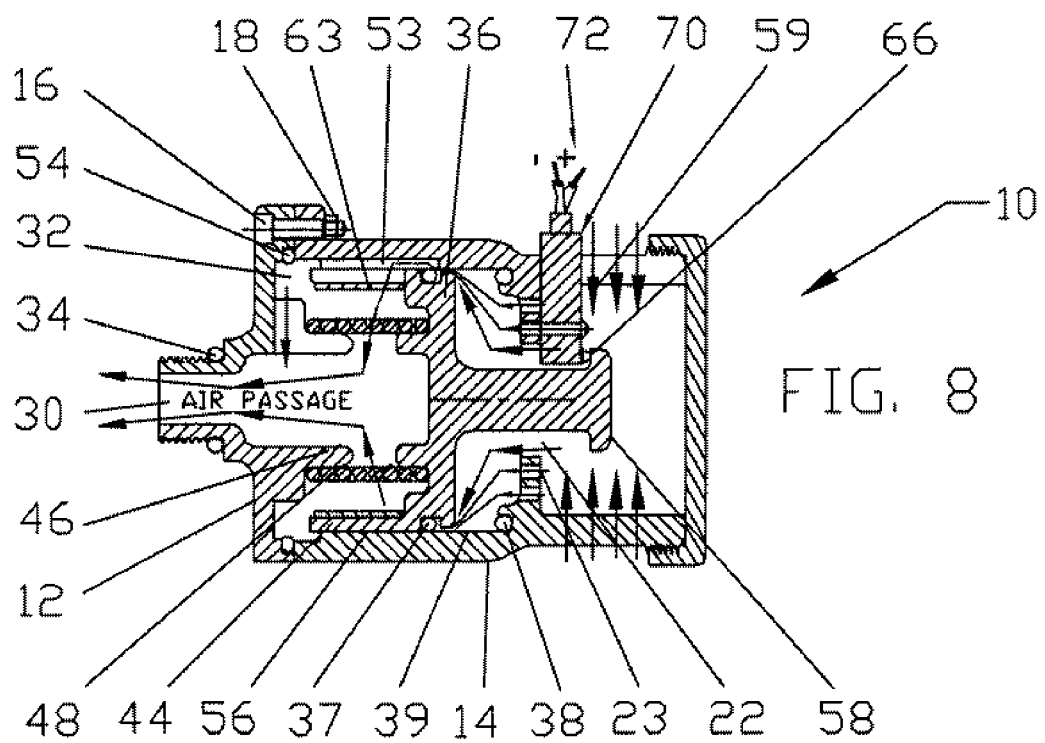
FIG. 8 is a cross-sectional view similar to FIG. 7, but illustrating the safety valve in an open position, permitting air to flow therethrough and into a pump of the swimming pool system, and activating a switch.

With reference now to FIGS. 3 and 5, it is seen how the channels 52 extend through the seat 46 and towards the aperture 30 of the base plate 12. This allows air to flow from the housing into the pump, even when the spring 48 is completely compressed. The inner wall of the housing also includes at least one depression 53, typically in the form of elongated flutes or channels, which permit air to pass through the housing around the sealing element 36 when the sealing element 36 is moved into the inner chamber, as illustrated in FIG. 8.

Figure 6:
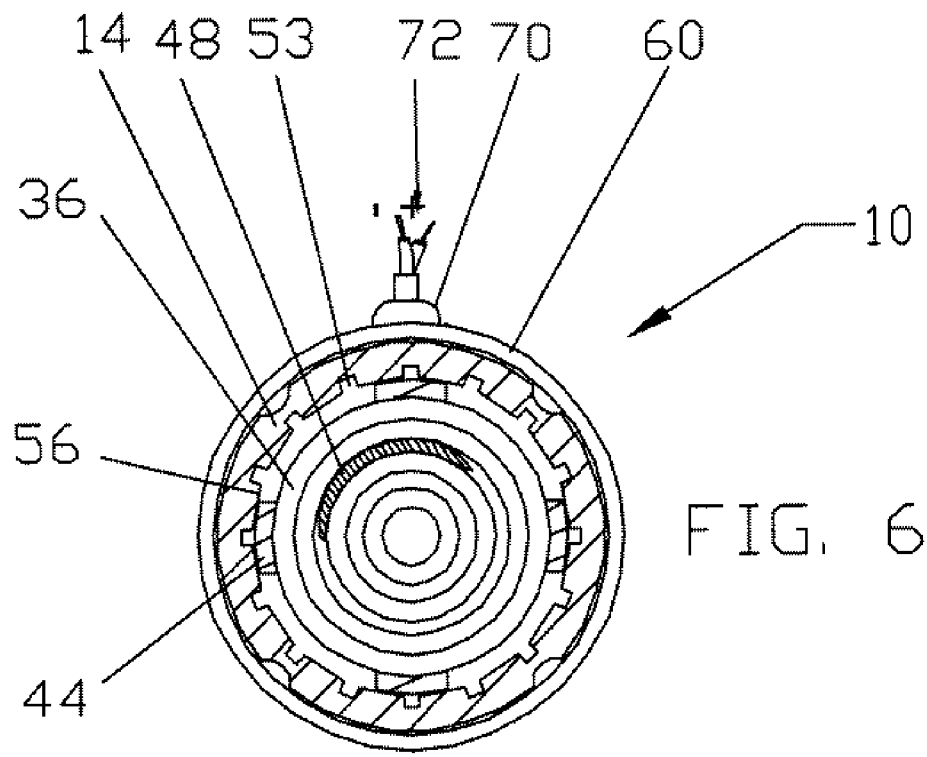
FIG. 6 is a cross-sectional view taken generally along lines 6-6 of FIG. 3.

With reference now to FIG. 6, the sealing element 36 is shown with end extensions of the arms 44 in engagement with the surface of the inner wall 56 of the cap 14 of the housing. The flexed arms 44 serve as a guide for the sealing element 36.

Figure 7:
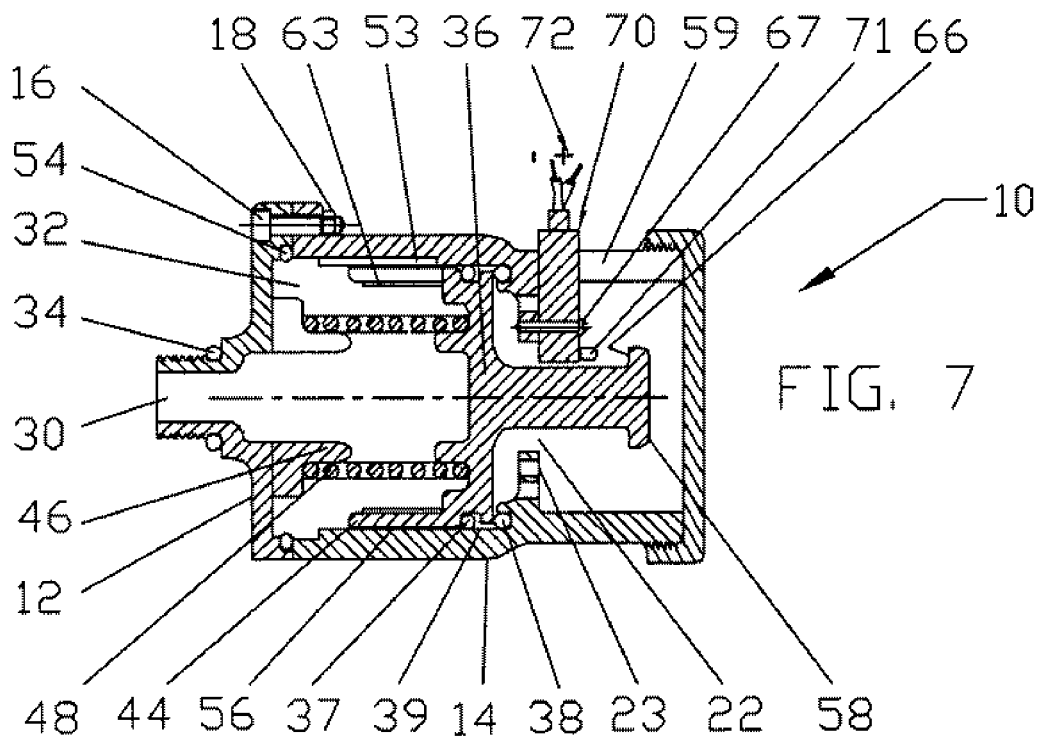
FIG. 7 is a cross-sectional view taken generally along lines 7-7 of FIG. 1, illustrating the safety valve in a closed position.

With reference again to FIGS. 1-4, in a particularly preferred embodiment, the present invention incorporates an electric switch assembly 70 having a depressable member 71 such that when the depressable member 71 is depressed, the switch is activated or changed from an open to a closed state such that electricity can flow through wires 72 to an electric circuit so as to shut off power to the pump. An illustrative embodiment is shown in the attached figures, wherein the sealing element 36 includes a projection or plunger 58 having an enlarged end forming a ledge 66. The depressable member 71 of switch 70 is positioned such that the plunger ledge 66 and the depressable member 71 are in alignment with one another. Normally, the sealing element 36, and thus the plunger 58, is biased upwardly or outwardly such that the ledge 66 and the depressable member 71 are not in contact with one another. However, as will be more fully described herein, in an excessive vacuum situation when the sealing element 36 is moved into the inner chamber 32 and towards to the base plate 12, the plunger ledge 66 comes into contact with the depressable switch member 71. Such is illustrated in FIGS. 7 and 8. As illustrated in FIG. 8, when the sealing element 36 is moved inwardly into the housing, spring 48 is compressed and the air inlets 22 and 23 open such that air can flow therethrough, around sealing element 36, into flutes or internal channels 53, and through air outlet 30 and into the pump such that the pump loses its prime, as described above. Simultaneously, the plunger 58 is moved downwardly and into contact with the depressable member 71 of switch 70. Typically, switch 70 is secured to the housing via bolts 67 or the like. As will be more fully described herein, depression of the switch mover 71 provides power to an electric circuit which shuts off power to the pump.

To prevent the inadvertent depression of plunger 58, such as with an external object or by a child or the like, wall projections 64 extend upwardly from the cap 14 in spaced relation to one another. A cover plate 60 is attached to the wall projections 64. Typically, the cover plate 60 includes internal threads 61 which engage the threads 62 at the end of the projections 64. In this manner, the plunger 58 will not be inadvertently depressed, yet air can still flow through the gaps 59 between the wall projections 64 and into the safety valve 10 during an excessive negative pressure situation.

Although a particularly preferred embodiment has been illustrated and described having a depressable switch member 71, it will be understood by those skilled in the art that any type of electric, photoselective, wireless switch or the like wherein the inward movement of the sealing element 36 can activate the control circuit and shut off power to the pump is contemplated by the present invention. For example, an electrical contact can be embedded within the sealing element 36, and when the sealing element moves inwardly, the contact comes into physical proximity or direct contact with another electrical contact to close an electrical circuit, thus permitting electricity to flow to the electric circuit and shut off power to the pump. The important aspect of the present invention is that the physical movement of the sealing element 36 results in activating the electric circuit such that the electric circuit at least temporarily shuts off power to or otherwise disables the pump.

With reference now to FIGS. 3, 7 and 8, the general operation of the safety valve will now be explained. With reference to FIG. 7, the at rest position of the sealing element 36 is biased upwardly or outwardly such that the upper plate portion 40 engages the O-ring 38 so as to effectively seal the air inlet apertures 22 and 23. In this position, O-ring 37, resting in groove 42, engages inner wall 39 for primarily air tight sealing. This is the standard position for normal operating conditions. For example, when the safety valve 10 is connected to the pump, water from the pump enters aperture 30 and fills the inner chamber 32 of the housing. The sealing element 36 is biased outwardly so as to seal the safety valve 10 while the pump is in normal operation, or is off.

However, with reference to FIG. 8, when a drain or inlet of the swimming pool or spa is obstructed, such as if a child were to be held at the drain port, the vacuum within the pump significantly increases causing the sealing element 36 to be pulled into the inner chamber 32. The spring 48 is compressed by such action, and air (illustrated by the directional arrows in FIG. 8) flows into the safety valve 10 through the air inlet apertures 22 and 23 which are now open. The sealing element 36 is designed so that the air can flow around it and through channels 53 as shown in FIGS. 6 and 8. The air then flows through aperture 30 and into the pump, causing it to lose its prime. As can be seen in FIG. 8, even when the spring 48 is completely compressed such that the coils rest upon one another, the air is still able to pass into aperture 30 due to the channels 52 formed in the seat 46.

When the pump loses its prime, the child or other object is able to be removed from the drain or inlet. This causes the high vacuum condition within the pump to return to normal, and thus the spring 48 to begin to bias the sealing element 36 upwardly again.

Simultaneously, the portion of the sealing element 36 which activates switch assembly 70 closes an electric circuit, as will be more fully described herein, causing the pump to at least temporarily be shut off. Thus, the child or object near the drain is able to be completely moved away from the drain.

Otherwise, if the sealing element 36 were to immediately return to its closed position, the object or child may be too close to the drain so as to be sucked against it again.

The sealing element 36 and arms 44 can be comprised of a resilient material, such as nylon, causing the arms 44 to be biased outwardly against the housing inner wall. However, it has been found that if the valve is open and closed several times, such as a dozen times or more, the arms 44 can be worn down. Other materials, such as Teflon, enable the sealing element 36 to be opened and closed numerous times, such as one hundred times or more. However, it has been found that many of these materials, while more durable, do not have the resilient qualities of the nylon material. Accordingly, in a preferred embodiment, a spring, such as the illustrated flat spring 63, is disposed within the arms 44, causing them to be biased outwardly against the housing wall.

It will be appreciated by those skilled in the art that the present invention provides a safety valve which adjusts itself to any pump size and/or any existing pool piping/filtration system. The design of the seal compensates pneumatically to any pool system variations. As described above, the O-ring gasket 37 engages radially with the inner ledge 39 of the housing, causing the sealing element 36 to act as a floating piston. Any vacuum level that is below the entrapment level will cause the sealing element 36 to move slightly inward to compensate for slight vacuum variations. This is due to the fact that the sealing element must travel a sufficient distance before air enters into the housing and into the pump, as illustrated in FIG. 8. Thus, for pumps which have a greater horsepower or rating, the sealing element 36 can actually travel slightly into the housing without the pump losing its prime. This also allows small objects, such as leaves and the like, to be caught in the drains without causing the pump to lose its prime. However, if the drain becomes clogged, such as with a child, the sealing element 36 will be moved into its open position. Thus, the present invention adjusts itself to any normal or abnormal suction variations present within the pool circulation system.

The size and characteristics of the spring 48 can also be selected according to the pool pump. The larger and more powerful the pump, the larger and more powerful the spring 48. This is determined on a pump by pump basis when the safety valve 10 is manufactured. Accordingly, there is no experimentation or adjustment of the safety valve 10 like the prior art. Similarly, there are no adjustment knobs that can be inadvertently adjusted causing the pump to lose its prime when it is not necessary, or even worse resulting in the safety valve not performing when it should, as is the possibility with the prior art. Instead, the homeowner or service personnel need merely to specify the pump for which the safety valve is to be installed such that the safety valve includes the necessary spring that matches the specific pump vacuum level.

Figure 9:
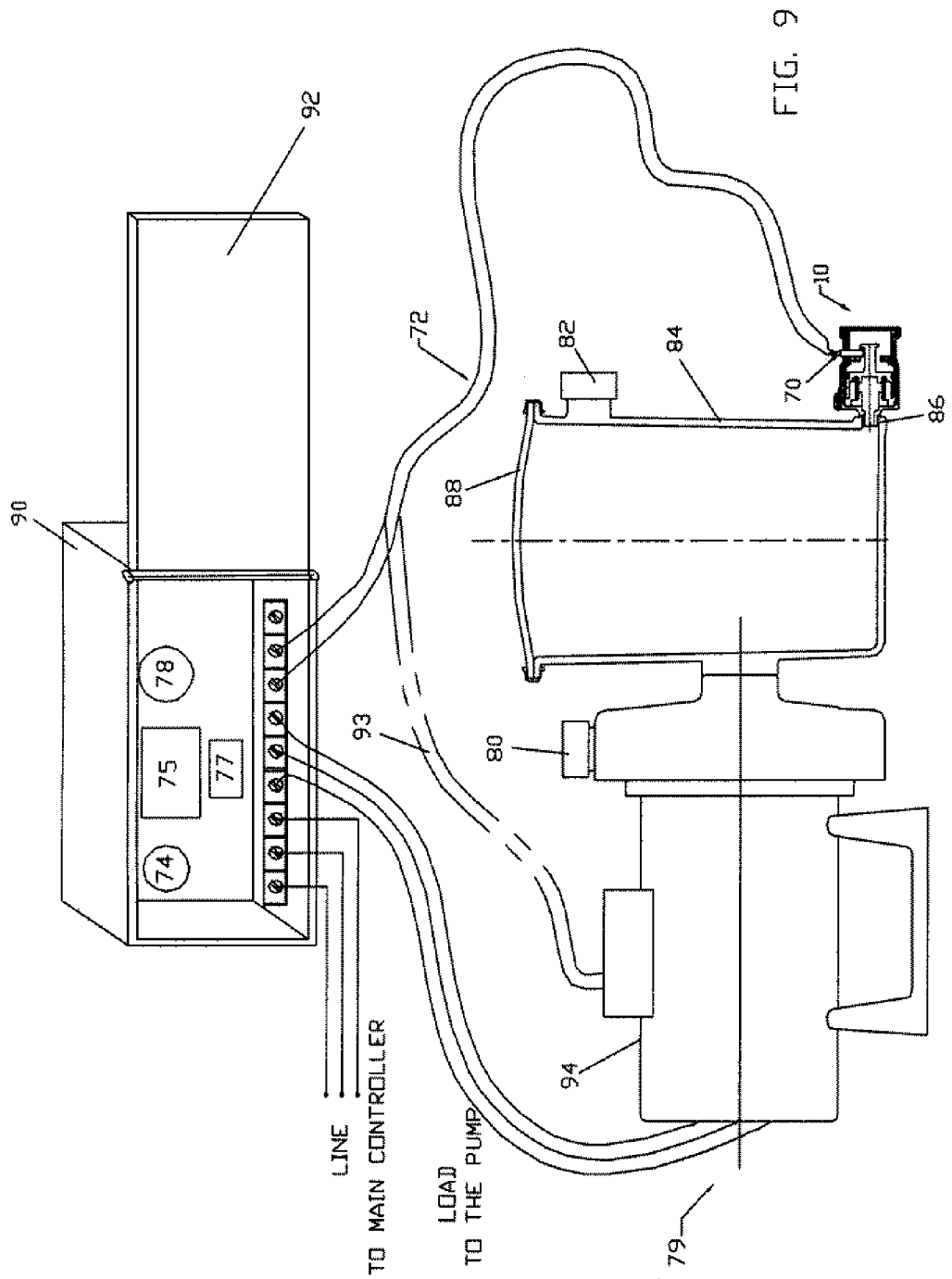
FIG. 9 is a diagrammatic view of a pump having the safety valve of the present invention inserted in a drainage port thereof, and operably connected to a control circuit in accordance with the present invention.

With reference now to FIG. 9, an exemplary diagram of a pump 79 is illustrated. The pump 79 includes a discharge port 80 and a main suction port 82, which in this case is part of a pot 84 attached to the pump 79. In a particularly preferred embodiment, the safety valve 10 of the present invention is threadedly inserted into a threaded aperture 86 which would otherwise hold the drain plug. This has many advantages. First, the safety valve 10 of the present invention is directly attached to the pump 79 itself, lessening the reaction time between the pump high vacuum condition, and the response by the safety valve 10 to cause the pump 79 to lose its prime. Another advantage is that the size of the aperture 86 can be another indicator to specify the pump and safety valve 10. Pumps typically have different diameter drain plug outlets 86. Thus, the threaded extension 26 of the safety valve 10 of the present invention can match the particular pump and will not fit another pump.

Another advantage is that the safety valve of the present invention now serves a dual purpose. In addition to performing the safety function described above, the safety valve 10 also serves as a discharge (drainage) port for winterizing and the like. Typically, a drain plug is threadedly received in the drain port 86. When the pump is not going to be used for prolonged periods of time, or when cold weather is eminent, the drain plug is removed such that the water within the pump drains therefrom. In this case, the safety valve device 10 could be unthreaded and removed, causing the water within the pump to flow out of the pump. Alternatively, the safety valve device 10 could be unthreaded and removed from the discharge port 86 in order to drain the pump 79 for winterizing purposes. Although the threaded extension 26 is illustrated as being generally centered with respect to the base plate 12, it will be appreciated that the extension 12 can be offset to achieve the same purposes.

It will be appreciated that the safety valve 10 of the present invention can also be attached to the pump 79 by other means. A hole can be drilled into the inlet port or in the pot, such as the lid 88 of the pot 84. The safety valve 10 of the present invention can be attached thereto, such as by threaded engagement with the internally threaded hole. In such a case, the drain plug would be inserted into the drain aperture 86 in normal fashion. It will be appreciated that the pump manufactures could create the pump 79 or pot 84 so as to incorporate the safety valve 10 of the present invention as original manufacturing (OEM) during the manufacturing of the pump 79 itself by integrating or molding the base plate 12 directly onto the pot 84 or onto the suction port of the pumps that do not contain a pot.

Although it is preferred to have the safety valve 10 of the present invention directly attached to the pump 79 itself, and most desirably to the drain aperture 86 such that the pool owner can install the safety valve 10 by himself or herself, it is also contemplated that the safety valve 10 could be attached to other parts of the pump and filtration system. That is, for any exposed portions of the piping on the suction-side of the pump system. The safety valve 10 of the present invention could be inserted into the pipe. Instead of requiring cuts to the pipe, etc., the piping could merely be drilled and threaded so as to receive the safety valve 10. Alternatively, the safety valve 10 could be sealed using adhesive or the like.

With continuing reference to FIG. 9, the electrical leads 72 of the switch assembly 70 extend to a control circuit, typically housed within a box 90 preferably having a lockable door 92 or housed in the pump motor 94 itself via phantom leads 93. As will be more fully described herein, the electric circuit within the box 90 or the pump motor 94 serves to at least temporarily shut off the power to the pump 79 when an excessive negative pressure within the pump 79 or water circulation system is encountered. Of course, it will be appreciated by those skilled in the art, that although it is preferred to have the safety valve 10 in conjunction with electrical circuits, it is also contemplated that the safety valve 10 could be utilized solely without the need for any electrical circuits or devices.

Figure 10:
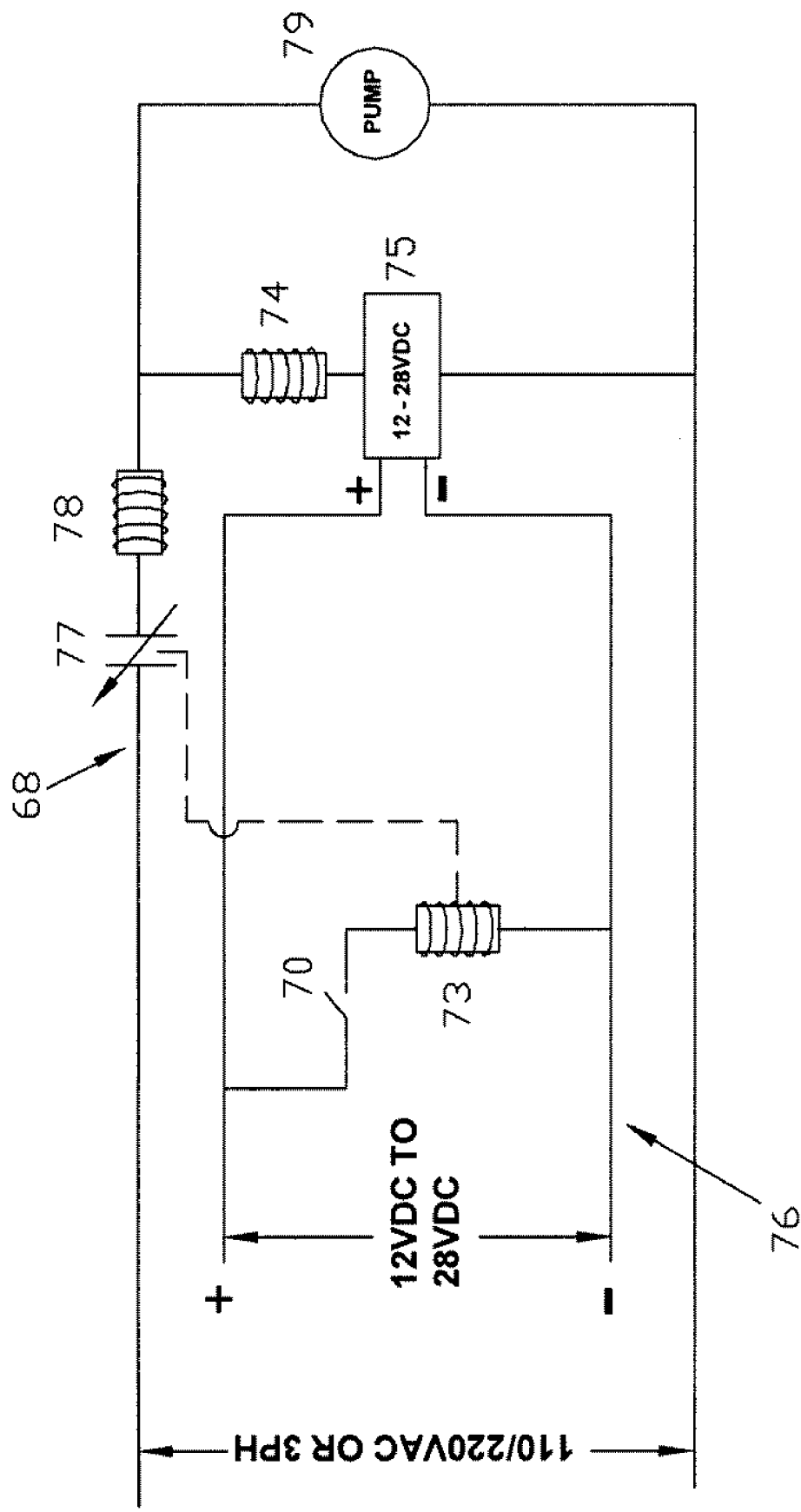
FIG. 10 is a diagrammatic view of an electric circuit used in accordance with the present invention.

With reference now to FIG. 10, an illustrative wiring diagram consisting of two electrical circuits, namely, a high voltage alternating current circuit 68 and a low voltage direct current circuit 76. The high voltage circuit 68 includes a normally closed switch 77, a time delay relay 78 and the pump 79. The low voltage circuit 76 includes a time delay relay 74, a low voltage direct current output transformer/ power supply 75, switch 70 and relay 73. When switch assembly 70 is actuated from its biased open circuit position to a closed circuit position, or is otherwise actuated, relay 73 is energized, causing normally closed switch 77 to open and turn the pump off. In a particularly preferred embodiment, another time delay relay 78 is used to postpone the pump restart, such as a five minute delay, after an entrapment to allow for enough time to free the impediment while also automatically supplying power to the pump again so as to avoid the need to manually reset the system.

Figure 11:
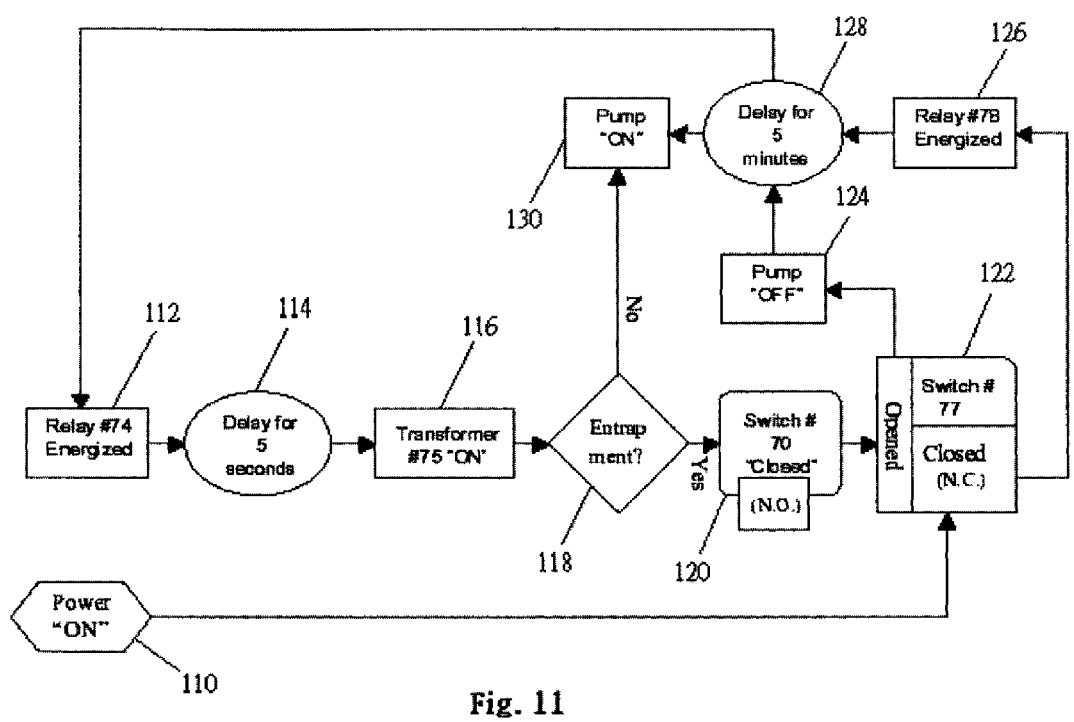
FIG. 11 is a diagrammatic view of the steps taken in accordance with the present invention.

With reference now to FIG. 11, the sequence of events are such that the pump is initially powered on 110. Time delay relay 78 is energized 126 causing the start up of pump 79 to be delayed for a predetermined time, typically five minutes. After the five minute delay 128, the pump will start on 130, and run on the normal filtration cycle using typical power supply such as 110 or 220 alternating current voltage or 3-phase power supply. After this delay, relay 74 is energized 112. This relay serves to delay the powering of transformer 75 for a predetermined time, such as five seconds 114. Thus, time delay relay 74 acts as a surge-ignoring device when the pump is initially powered on. It is not uncommon when pumps are powered on initially that a high vacuum level occurs. To prevent the electric circuit 76 from immediately shutting off the pump, relay 74 is energized and delays the providing of power to the rest of the circuit for at least several seconds. The pump starts and runs on the normal filtration cycle using the typical power supply, such as a 110 or 220 alternating current voltage or 3 PH power supply.

After the five second delay, the transformer 75 is energized 116 as the 12 volts to 28 volts of direct current is output to transformer 75. The pump remains on until there is an entrapment 118, determined when the switch 70 is closed from its normally open position 120.

As described above, upon entrapment or blockage, the vacuum level inside the pump 79 is elevated creating a differential pressure across sealing element 36, allowing atmospheric air to push the sealing element 36 and compress spring 48 until the sealing element 36, and any associated O-rings, passes grooves 53 in the housing, allowing atmospheric air to rapidly fill the pot 84 resulting in the pump 79 losing its prime. Simultaneously, plunger 58 moves downwardly into contact with the switch depressable member 71 to close switch 70. Closing switch 70 results in opening switch 77 which is normally closed 122. This immediately shuts off power to the pump 124. This all occurs in a fraction of a second. Switches 70 and 77 automatically and momentarily return to their normally open and normally closed positions, respectively.

The sealing element 36 and plunger 58 will spring back momentarily to normal operating condition once the excessive negative pressure condition is alleviated, such as by removing the entrapment or blockage from the drainage system. In a particularly preferred embodiment, a time delay relay 78 is energized 126 resulting in a delay of a predetermined amount of time, such as five minutes 128, before the power to the pump is restored and the pump is powered on 130 again automatically. Of course, it will be appreciated by those skilled in the art that the pump could be required to be manually reset and powered on. However, it is believed that the delay and automatic powering of the pump is preferable. The five minute delay is used to postpone the pump restart immediately after an entrapment to allow for enough time to free the impediment. However, manual resetting of the pump is not required.

As mentioned above, the valve system of the present invention not only serves as a safety valve which temporarily shuts off the pump by forcing the pump 79 to lose its prime as well as shutting power off to the pump, but also serves as a wintering device and a surge suppressor. As a wintering device, as described above, the valve 10 can be removed and the water drained from the drainage port 86. The surge suppressor function is achieved by venting off the sudden vacuum rise while the sealing element 36 is momentarily depressed. During surges, the valve 10 protects the pump filtration equipment against shocks and vibrations during pump start-ups resulting in reduced maintenance cost, less down time and longer equipment life. The electric circuit 76 also accounts for such surges by incorporating relay 74 so as to delay the supply of electricity to the remainder of the circuit for at least a few seconds, as described above, so that the pump is not automatically shut off within the first few seconds of operation when surges typically occur. The safety valve 10 itself will not open and vent the suction line to atmosphere unless the pump vacuum level is exceeded in the course of operation, such as an initial vacuum surge or body entrapment or the like.

The safety valve of the present invention provides many advantages over those disclosed in the prior art. The safety valve of the present invention does not require site calibration or experimentation at the pool site. There are no complex mechanisms to keep the valve open, and the safety valve of the present invention is simple in design and construction, thus rendering it relatively inexpensive and easy to install and use. The safety valve of the present invention works not only with large water recreational installations, but also residential hot tubs, spas and swimming pools. In fact, the present invention is particularly suited for such residential pools and spas. The safety valve of the present invention does not require cutting of pipes or specialized tools. The valve is relatively small and easily retrofitable on most pump filtration systems of pools, spas and hot tubs.

Although several embodiments have been described in detail for purposes of illustration, various modifications may be made to each without departing from the scope and spirit of the invention. Accordingly, the invention is not to be limited, except as by the appended claims.

What is claimed is:

1. A vacuum relief safety system for a swimming pool or spa, comprising:

a housing defining an inner chamber and attached directly to a pump or pump pot of the swimming pool or spa water circulation system so as to be in fluid communication therewith;

an air inlet aperture formed in the housing and open to ambient air;

a sealing element disposed within the housing;

a spring disposed within the inner chamber for biasing the sealing element against the air inlet aperture so as to effectively seal the inner chamber from ambient air, wherein the sealing element moves into the inner chamber and opens the air inlet aperture when a maximum allowed vacuum level within the pump is exceeded, whereby air is introduced through the air inlet aperture and the housing and into the pump causing the pump to lose its prime; and an electronic circuit, including a switch actuatable by the sealing element when the sealing element moves into the inner chamber, wherein the actuation of the switch causes the electronic circuit to shut off power to the pump.

2. The system of claim 1, wherein the housing is threadedly connected to a drainage port of the pump.

3. The system of claim 1, wherein the sealing element comprises a piston, disc or a ball.

4. The system of claim 1, including a seat formed in the housing against which an end of the spring generally opposite the sealing element engages, the seat having a channel formed therein to permit water or air to pass therethrough and into the pump when the spring is compressed.

5. A vacuum relief safety system for a swimming pool or spa, comprising:
a housing defining an inner chamber and attached to a suction-side of a pump of the swimming pool or spa water circulation system so as to be in fluid communication therewith;
an air inlet aperture formed in the housing and open to ambient air;
a sealing element disposed within the housing;
a spring disposed within the inner chamber for biasing the sealing element against the air inlet aperture so as to effectively seal the inner chamber from ambient air, wherein the sealing element moves into the inner chamber and opens the air inlet aperture when a maximum allowed vacuum level within the pump is exceeded, whereby air is introduced into the pump causing the pump to lose its prime; and
an electronic circuit, including a switch actuatable by the sealing element when the sealing element moves into the inner chamber, wherein the actuation of the switch causes the electronic circuit to shut off power to the pump;
wherein the housing is comprised of a base plate and a cap cooperatively defining the inner chamber, and wherein the base plate includes an outwardly threaded extension and an aperture extending through the extension and base plate and into the inner chamber, and wherein the air inlet aperture is formed in an end wall of the cap generally opposite the base plate.

6. The system of claim 1, wherein the sealing element includes arms extending therefrom and adapted to guide the movement of the sealing element within the housing.

7. The system of claim 1, including a gasket disposed between the sealing element and an upper ledge of the housing when the sealing element is in a closed position.

8. The system of claim 1, wherein a portion of the sealing element contacts a smooth inner wall portion of the housing during limited travel of the sealing element so as to compensate for acceptable pump vacuum variations.

9. A vacuum relief safety system for a swimming pool or spa, comprising:
a housing defining an inner chamber and attached to a suction-side of a pump of the swimming pool or spa water circulation system so as to be in fluid communication therewith;
an air inlet aperture formed in the housing and open to ambient air;
a sealing element disposed within the housing;
a spring disposed within the inner chamber for biasing the sealing element against the air inlet aperture so as to effectively seal the inner chamber from ambient air, wherein the sealing element moves into the inner chamber and opens the air inlet aperture when a maximum allowed vacuum level within the pump is exceeded, whereby air is introduced into the pump causing the pump to lose its prime; and
an electronic circuit, including a switch actuatable by the sealing element when the sealing element moves into the inner chamber, wherein the actuation of the switch causes the electronic circuit to shut off power to the pump; and
a spring disposed within arms of the sealing element to bias the arms into engagement with the inner wall of the housing.

10. The system of claim 1, wherein the inner wall of the housing includes at least one elongated depression formed therein and adapted to allow air to pass therethrough and into the pump.

11. The system of claim 1, wherein the switch includes a depressible member aligned with a projection of the sealing element such that inward movement of the sealing element causes the projection of the sealing element to contact the depressible member and actuate the switch.

12. The system of claim 1, wherein the electronic circuit is configured to temporarily shut off power to the pump for a predetermined time, and then re-supply power to the pump after the predetermined time has elapsed.

13. The system of claim 1, wherein the electronic circuit includes delay circuitry configured to delay operation of the electronic circuit for a predetermined period of time to permit vacuum surges that occur during initial pump powering without turning off power to the pump.

14. The system of claim 1, wherein the switch comprises a mechanical, wireless, a photoelectric, or a motion sensing switch actuated by movement of the sealing element.

15. A vacuum relief system for a swimming pool or spa pump, comprising:
a housing defining an inner chamber and threadedly attached directly to the drainage port of the pump so as to be in fluid communication therewith;
an air inlet aperture formed in the housing and open to ambient air;
a sealing element disposed within the housing and biased against the air inlet aperture so as to effectively seal the inner chamber from ambient air, and adapted to move into the inner chamber and open the air inlet aperture if a maximum allowed vacuum level within the pump is exceeded, whereby air is introduced into the pump such that the pump loses its prime; and
an electronic circuit operably connected to the pump, the electronic circuit including a switch having a depressible member in alignment with a projection of the sealing element;
wherein movement of the sealing element into the inner chamber causes the sealing element projection to depress the depressible member and actuate the switch; and
wherein the actuation of the switch causes the electronic circuit to shut off power to the pump.

16. The system of claim 15, wherein the sealing element comprises a piston, disc or a ball.

17. The system of claim 15, including a seat formed in the housing against which an end of the spring generally opposite the sealing element engages, the seat having a channel formed therein to permit water or air to pass therethrough and into the pump when the spring is compressed.

18. The system of claim 15, wherein the housing is comprised of a base plate and a cap cooperatively defining the inner chamber, and wherein the base plate includes an outwardly threaded extension and an aperture extending through the extension and base plate and into the inner chamber, and wherein the air inlet aperture is formed in an end wall of the cap generally opposite the base plate.

19. The system of claim 15, wherein the inner wall of the housing includes at least one elongated depression formed therein and adapted to allow air to pass therethrough and into the pump when the sealing element is moved into the housing.

20. The system of claim 15, wherein the electronic circuit is configured to temporarily shut off power to the pump for a predetermined time, and then re-supply power to the pump after the predetermined time has elapsed.

21. The system of claim 15, wherein the electronic circuit includes delay circuitry configured to delay operation of the electronic circuit for a predetermined period of time to permit vacuum surges that occur during initial pump powering without turning off power to the pump.

* * * * *